United States Patent [19]
Allen et al.

[11] 3,882,889
[45] May 13, 1975

[54] FLOW CONTROLLING SYSTEM

[75] Inventors: Kenneth M. Allen; Chester H. Harper, both of Newberg, Oreg.

[73] Assignee: Allen-Harper, Inc., Newberg, Oreg.

[22] Filed: Feb. 19, 1974

[21] Appl. No.: 443,423

Related U.S. Application Data

[60] Division of Ser. No. 146,299, May 24, 1971, which is a division of Ser. No. 23,093, April 6, 1970, abandoned, which is a continuation of Ser. No. 713,932, March 18, 1968, abandoned.

[52] U.S. Cl. ............ 137/454.2; 251/61.4; 251/61.2
[51] Int. Cl. ............................................. F16k 51/00
[58] Field of Search .......... 137/454.2, 454.5, 454.6; 251/61.2, 61.4

[56] References Cited
UNITED STATES PATENTS

| | | | |
|---|---|---|---|
| 3,388,864 | 6/1968 | Noakes | 137/454.2 X |
| 3,768,770 | 10/1973 | Kayser | 251/61.2 X |

Primary Examiner—Arnold Rosenthal
Attorney, Agent, or Firm—Klarquist, Sparkman, Campbell, Leigh, Hall & Whinston

[57] ABSTRACT

A blower (54) (FIG. 1) supplies air to a plurality of pneumatic deflectors (26) individually controlled by valves (46) to deflect products off a conveyor (22) to receiving devices (32). The blower is modulated to supply air under a constant pressure by a valve (70) controlled by a power diaphragm controlled by a control diaphragm (72) acting as a valve for a bleeder tube (140). Each deflector comprises a tube having a circumferential slit (246) and groove (248) forming an orifice. Each valve (46) is quickly disassembled by tie rods and has a diaphragm controlled by a senser (44) at one of the receiving devices (32). The senser includes a sensing vane (352) controlling a bleeder valve member (320) to control pressure to the valve (46). The senser is protected by an overload relief device (344). A flow controlling system (600) (FIG. 14) includes a power diaphragm (638) controlled by a control diaphragm (626) and controlling a bleeder valve 645 to control liquid pressure to a flow control valve (602), the power and control diaphragms being detachably mounted on a reservoir of the liquid. A close wound spiral spring (702) having a feeler knob (704) engaging a scale member (706) is deflected in accordance with load on the scale member to bleed air from a line (708) to a control cylinder (710) to regulate feed of material to the scale member.

4 Claims, 18 Drawing Figures

FLOW CONTROLLING SYSTEM

This is a DIVISION of applic. Ser. No. 146,299, filed May 24, 1971, which is a division of applic. Ser. No. 23,093, filed Apr. 6, 1970 (abandoned) which is a continuation of applic. Ser. No. 713,932, filed Mar. 18, 1968 (abandoned).

DESCRIPTION

This invention relates to flow controlling systems, and more particularly to conveyors having pneumatic deflectors and controls therefor.

An object of the invention is to provide new and improved flow controlling systems.

Another object of the invention is to provide new and improved conveyors having pneumatic deflectors and controls therefor.

A further object of the invention is to provide a fluid flow regulator including a fluid flow responsive amplifier.

Another object of the innvention is to provide a device for maintaining constant pressure in a fluid line.

A still further object of the invention is to provide a regulator including a power diaphragm controlled by a control diaphragm.

Another object of the invention is to provide a pneumatic amplifier device.

Yet another object of the invention is to provide a system including a blower in which the output is kept at a constant pressure by an adjustable valve in the inlet thereof controlled by a power diaphragm subjected to fluid from the outlet which is allowed to bleed to an extent permitted by a control diaphragm responsive to the outlet pressure.

Another object of the invention is to provide a pneumatic deflector for a conveyor in which a nozzle is formed by an inwardly folded portion of a conduit positioned at one side of a circumferential slit in the conduit.

A further object of the invention is to provide a pneumatic deflector for a conveyor having a conduit in its side formed by a slit tapering longitudinally and also including a sleeve adjustable along the slit for varying the effective area of the orifice.

Another object of the invention is to provide a pneumatic deflector for a conveyor including a cylindrical conduit having a circumferential slit and a portion adjacent one side of the slit folded inwardly to form a tapered, trough-like passage and also including a split sleeve slidable along the conduit for covering a selected portion of the passage and also rotatably adjustable on the conduit to adjust the slit in the sleeve relative to the passage for deflecting fluid laterally from the passage.

Yet another object is to provide an easily assembled and disassembled pneumatically operated valve which closes upon drop in fluid pressure.

A further object of the invention is to provide a sensing device including a biased vane mounted pivotally and responsive to changes in fluid flow for actuating a flow control mechanism and coupled to the flow control mechanism by a coupling permitting free rotation of the vane without damage to the flow control mechanism.

Another object of the invention is to provide a fluid flow sensing device including a counterweighted shaft having an indexable coupling and mounting a sensing vane and driving a cam to actuate a needle valve to control flow of material past the vane.

Another object of the invention is to provide a flow controlling system in which a pneumatic amplifying device is mounted on a liquid reservoir and controls pressure of a liquid supplied to a regulator of a flow control valve.

Another object of the invention is to provide a sensing device including a spiral spring serving as a bleeder valve and deflected by a unit to be controlled.

The invention provides flow controlling systems preferably including a conveyor for conveying a stream of particulate material therealong together with a plurality of deflectors for blowing portions of the material off the conveyor to receiving devices. Air is supplied selectively to the deflectors through easily assembled and disassembled shutoff valves which close automatically when power to the valves is cut off. Each deflector preferably comprises a tubular conduit having tapered, inwardly folded passages extending therealong from circumferential slits with slit sleeves adjustable along the conduits to vary the effective size of the passages and adjustably rotatable on the conduit to deflect the fluid laterally of the conduit. Fluid is supplied to the deflectors under a constant pressure preferably by a flow modulating device including a blower having a valve in its inlet which is adjustable by a power diaphragm positioned by fluid supplied thereto from the outlet of the blower through a restrictive orifice, the pressure of the fluid actuating the power diaphragm being varied by varying a bleeder orifice by a control diaphragm which is controlled in position by fluid at the pressure at the outlet of the blower. Preferably each receiving device includes a vane fixed to a counterweighted shaft which biases the vane into the path of the material discharged from the conveyor. The shaft is preferably connected by a calibrated friction coupling to a cam engaging a cam follower controlling a needle valve controlling fluid pressure to the cutoff valve of the deflector associated with the receiving device. The vane also is adapted to rest on the top of a layer of material being conveyed along a conveyor and serving to actuate a device for controlling supply of the material to the conveyor to keep the thickness of the layer constant. In a device forming an alternate embodiment of the invention, a closewound spiral spring is deflected in accordance with the magnitude of a condition to be controlled and serves to bleed a fluid under pressure in accordance with the extent of the deflection of the spring to actuate a pressure responsive device in accordance with the extent of the bleeding.

A complete understanding of the invention may be obtained from the following detailed description of flow controlling systems forming specific embodiments thereof, when read in conjunction with the appended drawings, in which.

Referring now in detail to the drawings, a flow controlling system forming one embodiment of the invention includes a conveyor 20 (FIG. 1) which continuously advances particulate material such as, for example, potato chips along a conveyor trough 22 in a direction indicated by arrow 24. Portions of the material traveling in a swath along the upper, lefthand side of the trough are deflected by a pneumatic deflector 26 through a discharge opening 28 in a side wall 30 of the conveyor to a receiving station (not shown), which may be a packaging device like a packaging device 32 serving to receive material deflected by a pneumatic deflector 34 from a swath-like portion at the extreme lower righthand side portion of the trough through a discharge opening 36 in a side wall 38 of the trough. A further, swath-like portion of the material is deflected by a pneumatic deflector 40 through a discharge opening 42 in the side wall 38 to another receiving device (not shown) like the receiving device 32. To keep the flow of material to each receiving device 32 constant, a senser 44 responsive to rate of flow of the material regulates a valve 46 controlling flow of air under pressure from one of branch conduits 48 to one of the deflectors 26, 34 and 40. The branch conduits 48 are supplied with air under pressure by sections 50 of a header connected to an outlet conduit 52 connected to the outlet of a blower or pump 54. The blower preferably is of the centrifugal type driven by an electric motor 55 at a constant rate of speed. The air is supplied to the blower 54 from a filter 56 and an inlet conduit 58, and a flow modulating device 60 regulates the flow of air through the blower to keep the pressure of the air supplied to the header sections 50 constant regardless of wide variations in the amount of air called for by the sensers 44.

Figures 1, 2, 3, 11:
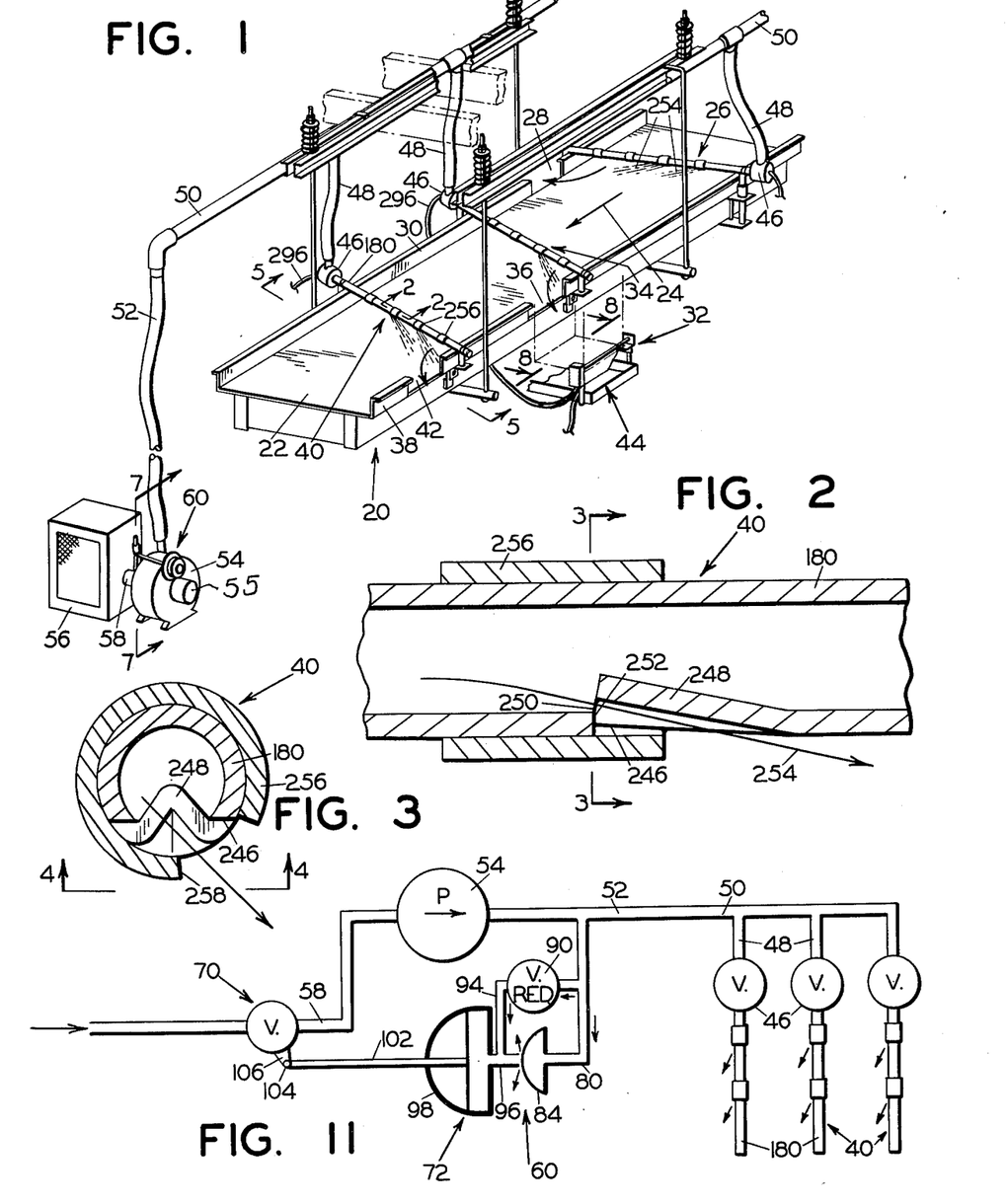
FIG. 1 is a perspective view of a flow controlling system forming one embodiment of the invention.
FIG. 2 is an enlarged, vertical section taken along line 2—2 of FIG. 1.
FIG. 3 is an enlarged, vertical section taken along line 3—3 of FIG. 2.
FIG. 11 is a schematic view of a flow modulating device of the flow controlling system of FIG. 1.
Figures 4, 5:
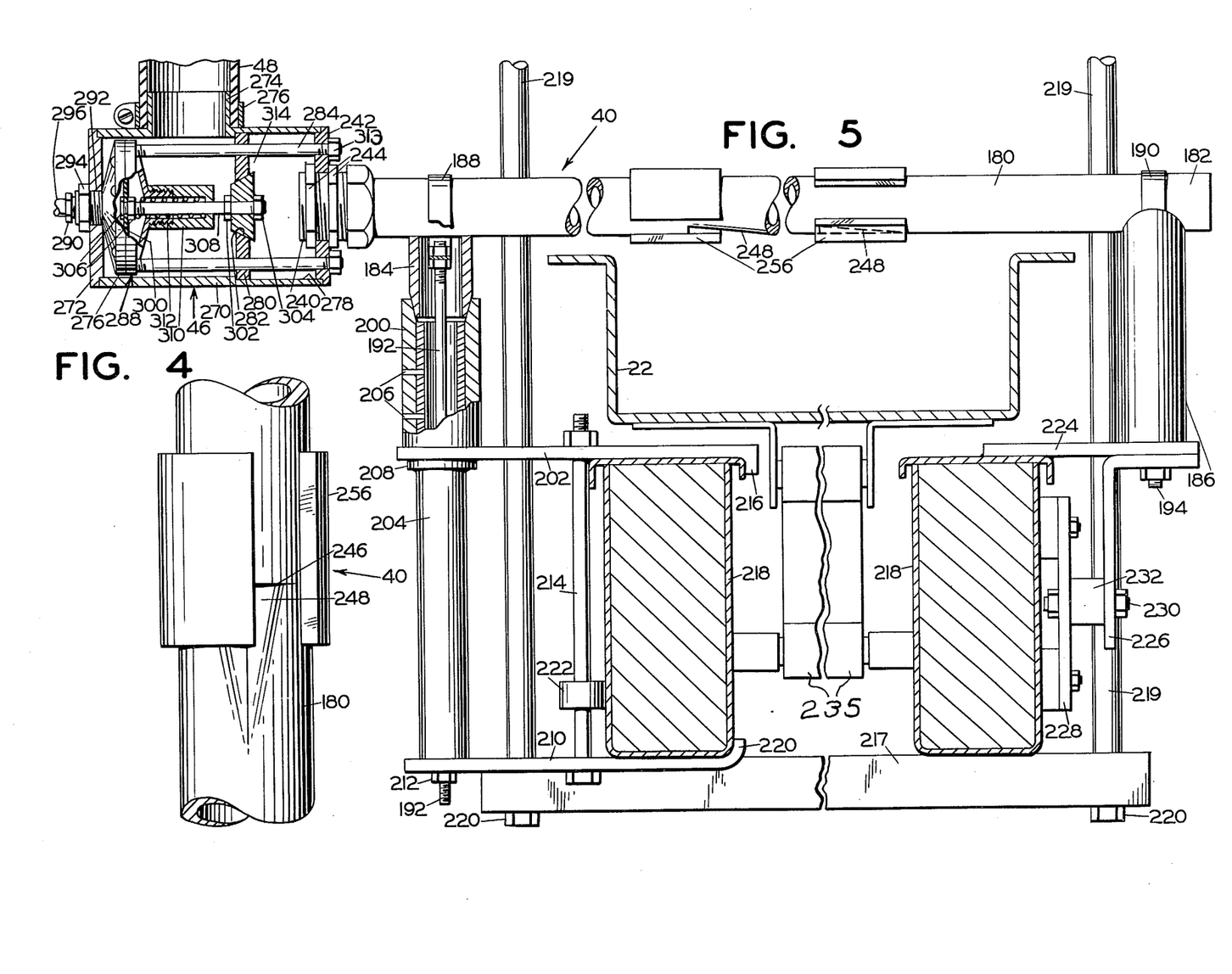
FIG. 4 is an enlarged view taken along line 4—4 of FIG. 3.
FIG. 5 is an enlarged vertical section taken along line 5—5 of FIG. 1.
Figures 6, 7:
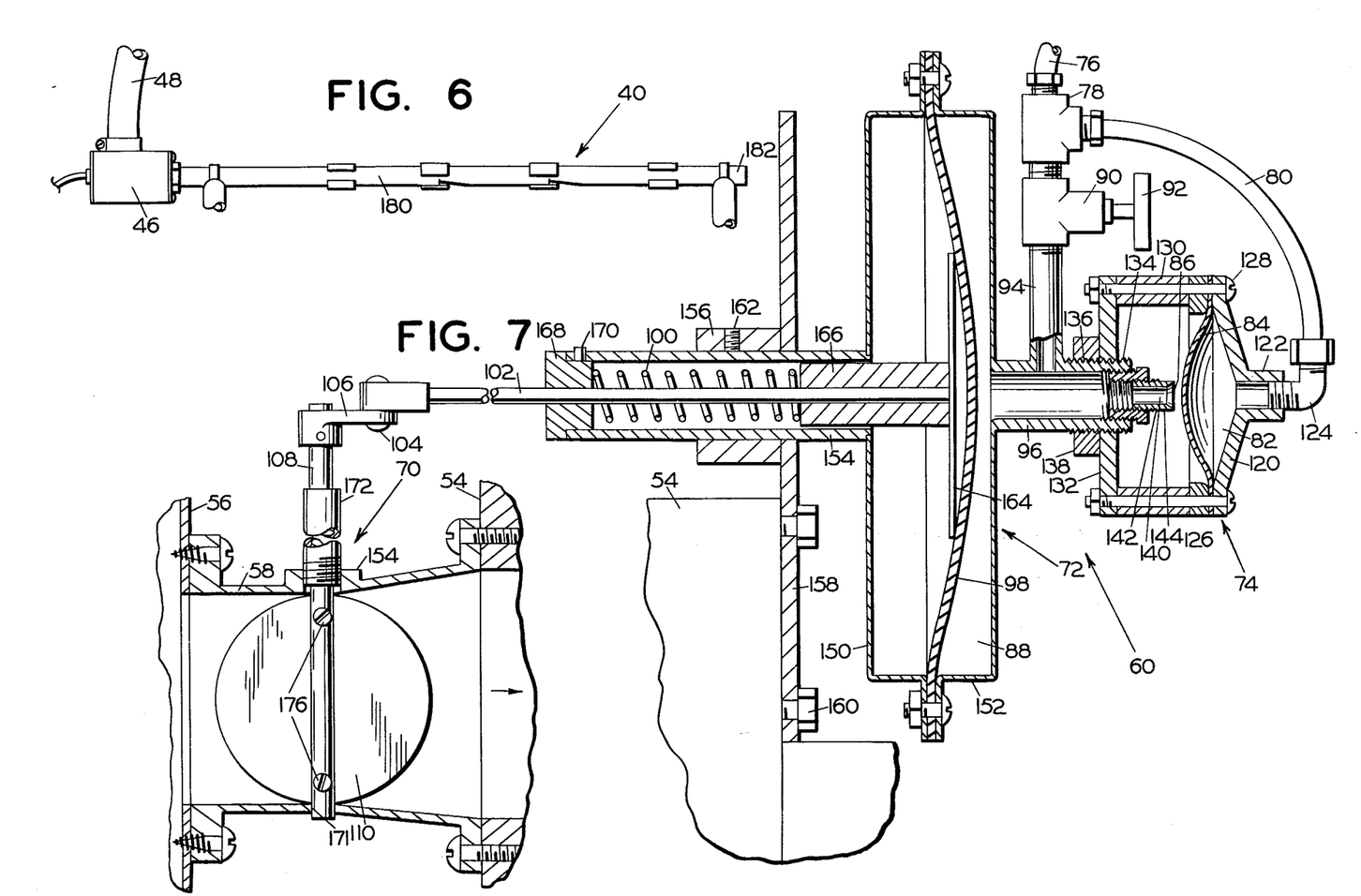
FIG. 6 is an enlarged elevation view of a deflector of the system of FIG. 1.
FIG. 7 is an enlarged vertical section taken along line 7—7 of FIG. 1.

The pressure of the output air of the blower 54, which preferably is driven at a substantially constant speed, is maintained constant despite wide variations in the amounts of air called for by the sensers 44. This is effected by the flow modulating device 60, which is best shown in FIGS. 1, 7 and 11. The device 60 includes a valve 70 in the inlet conduit 58, and the valve 70 is positioned by a power diaphragm 72 which is controlled by a control diaphragm 74 responsive to pressure of the air in the outlet conduit 52. When one of the valves 46 is closed to a greater extent, the pressure of the air in the conduit 52 and a control conduit 76 connected thereto rises. The conduit 76 is connected by a T-fitting 78 and a conduit 80 to a chamber 82 in the control diaphragm 74 to move the central portion of a flexible diaphragm member 84 farther to the left, as viewed in FIGS. 7 and 11, to further close a bleeder orifice 86. Air under an increased flow and pressure also is supplied to a chamber 88 of the power diaphragm 72 from the T-fitting 78 through a flow-restricting, pressure reducer 90, which is preferably of the needle valve type and adjustable manually by a knob 92 and conduits 94 and 96. The increased flow of air to the chamber 88 and the increased restriction of the orifice 86 cause the central portion of a flexible diaphragm member 98 to be moved to the left against the action of a spring 100 to move a rod 102 to the left. The rod 102 is connected by a loose coupling 104 to an arm 106 keyed to a shaft 108 keyed to a butterfly valve vane 110 in the conduit 58, and the movement of the rod 102 to the left turns the vane 110 to a position further restricting flow of air through the conduit 58. This reduces the input flow to the blower 54 which reduces the output flow of the blower which, of course, reduces the pressure of the air in the output conduit.

When there is a need for a greater flow of air to the header sections 50, the pressure of the air in the conduits 52, 76 and 80 drops. This causes a lesser, lower pressure flow to the chamber 88 and the drop in the pressure in the chamber 88 is amplified by the bleeder orifice 86 being increased by movement of the central portion of the resilient diaphragm 84 farther to the right, which movement results from the decrease in pressure in the chamber 82. The spring 100 then moves the diaphragm 98 and the rod 102 toward the right, and the arm 106 moves the vane 110 to further open the inlet conduit 58. This causes an increase in the rate of flow of air to and through the blower to the outlet conduit. This in turn raises the pressure of the air in the outlet conduit to that desired. It will be understood that the pressure of the air in the outlet conduit is kept substantially constant though, of course, there will be short periods of hunting where the load varies sharply, and the pressure of the air in the outlet conduit is very slightly higher for low load requirements than it is for high load requirements in order to provide the necessary differences in pressure to keep the flow modulating device 60 at the desired, different conditions of adjustment.

The control diaphragm 74 includes a bell 120 (FIG. 7) having a tapped inlet 122 connected by a fitting 124 to the conduit 80. The bell and an annular plate 126 clamp outer portions of the diaphragm member 84, and are supported by tie rods 128 and spacers 130 on a disc 132. The disc 132 has a central, tapped bore 134 adjustably screwed onto a threaded portion 136 of the pipe 96. A nut 138 on the threaded portion 136 holds the disc in adjusted position. A bleeder tube 140 is threaded into a tapped bushing 142 threaded into a tapped portion of the pipe 96. The diameter of the bleeder tube is a small fraction of the diameter of the unclamped portion of the diaphragm member 84, which is quite belled toward the tube 140. The tube 140 is, of course, perpendicular to the member 84, and an internal corner 144 of the tube may be rounded or tapered to provide a tapped exit portion to the passage through the tube.

The power diaphragm 72 includes a pair of flanged shells 150 and 152 clamped at their flanges to the outer portion of the diaphragm member 98 and sealed thereto. Air can flow relatively freely along the rod 102 into a central tube 154 welded to the shell 150 to keep the interior of the shell 150 at atmospheric pressure. The tube 154 is supported by a boss 156 of a plate 158 secured to the blower 54 by capscrews 160. A setscrew 162 secures the tube 154 to the boss. A large diameter rounded or belled plate 164 is fixed rigidly to the end of the rod 102 to provide a large surface area contact with the diaphragm member 98, and a guide sleeve 166 fixed to the rod slides freely in the tube 154. The spring 100 abuts the end of the sleeve 166 and a guide bushing 168 secured by a pin 170 in the tube 154. The shaft 108 is journaled in a bore 171 in the inlet conduit 58 and a nipple 172 screwed into tapped boss 174 of the inlet conduit. The vane 110 fits in a slot in the shaft 108, and is secured therein by screws 176.

As shown in FIGS. 1 to 6, each deflector 26, 34 and 40 comprises a thin-walled pipe or tube 180 having a plugged end portion 182, and the tube 180 is clamped in arcuately notched upper ends of sleeves 184 and 186 by straps 188 and 190 pulled downwardly and tensioned by pull rods 192 and 194. A lower tapered end portion 196 of the sleeve 184 fits into a tapered upper end portion 198 of a sleeve 200 abutting a bracket 202 and fixed to the upper end of a tube 204 by setscrews 206. The tube 204 projects through a hole in the bracket 202 and a collar 208 integral with the tube 204 abuts the bracket 202, which is removably held against the collar by the sleeve 200. A lower bracket 210 is brazed to the bottom end of the sleeve 204, and a nut 212 is screwed onto the pull rod 192. A bolt 214 holds the brackets 202 and 210 in the positions thereof shown in FIG. 5 in which a hooked end 216 of the bracket 202 overhangs one of base members 218 forming the support of the conveyor trough 22, the conveyor preferably being of a known, vibratory type. The base members are supported by cross members 217 and rods 219 resiliently supported by the ceiling. An upturned end portion 220 of the bracket 210 abuts the bottom of the lefthand member 218. A ring 222 of resilient material such as rubber or the like engages the side of the lefthand member 218. The sleeve 186 is supported on a bracket plate 224 secured to an angle member 226 carrying a plate 228 by a bolt 230 and a spacer 232. The plate 224 rests on the top of the righthand base member 218. A pair of permanent magnets 234 are fixed to the plate 228 and engage the adjacent member 218 which is of magnetic material such as steel, for example. The structure described above is quickly securable to and releasable from the members 218, and enables the deflectors 40 to be easily adjustable along the conveyor trough 22 and to any desired angle across the conveyor trough. The conveyor is suspended by pivotal struts 235 and is biased by springs (not shown) and driven by a known reciprocating or vibrator drive (not shown).

The tube 180 (FIGS. 1 to 6) is connected by a sealing nut 239 to a threaded bushing 240 on which an end wall 242 of the valve 46 is mounted between two nuts 244. The valve 46 supplies air under pressure to the tube 180. The tube 180 has a plurality of transverse circumferential slits 246 (FIGS. 2 to 4) spaced therealong of a length equal to about one-third of the circumference of the tube and, at one side of each of the slits, an inwardly folded or depressed, tapered, generally V-shaped in cross section, passage portion or groove 248 is provided to form an orifice or opening 250 with a corner 252 of the slit 246. The groove directs a stream 254 (FIGS. 1 and 2) of air angularly from the tube 180 and primarily across and slightly forwardly of the conveyor trough to propel the material to the discharge opening 28, 36 or 42 adjacent thereto. The tube 180 is shown in a position in which the orifices 250 are at the bottom thereof. However, the nuts 244 and bands 180 and 190 may be loosened, the tube turned so that the orifices 250 are directed forwardly as well as downwardly, and the nuts 144 and bands 188 and 190 retightened to hold the tube in the newly adjusted position. Each tube 180 has a plurality of split plastic sleeves or bands 256 thereon frictionally gripping the tube and adjustable along and rotatably adjustable on the tube. The bands have fairly wide longitudinal slits or slots 258 and may be rotated to desired positions like, for example, that illustrated in FIG. 3 to deflect the air streams laterally of the tube 180, the edge of the slit defining an orifice with the groove 248. The band also may be rotated to a position in which the slot 258 is completely remote from the groove 248 and adjusted lengthwise to define an orifice with the groove more restricted than the orifice 250. The bands also may be positioned to completely close off the groove as illustrated by the lefthand band of FIG. 1 on the deflector 40 adjacent the discharge opening 42.

Each valve 46 (FIGS. 1 and 5) includes a cylindrical housing 270 into which rabbetted end walls 242 and 272 fit and having a cylindrical inlet bore 274 to which one of the branch conduits 48 is clamped by a clamp 276. The housing 270 has a counterbore 278 into which an annular disc 280 having a central exit hole 282 fits slidably but closely enough to normally stay in the position shown. Headed tie rods 284 extending through the end wall 242 and the disc 280 are screwed into tapped bores in a shell 286 of a diaphragm 288 having a threaded nipple 290 projecting through a hole 292 in the end wall 272 and secured rigidly thereby by a nut 294. A control conduit 296 is connected by a fitting 298 to the nipple, and the lefthand side, as viewed in FIG. 5, of a diaphragm member 300 is supplied with control air thereby. A pull rod 302 mounting a flexible valve closure disc 304 is threaded into tapped member 306 secured to the diaphragm member 300. The pull rod is slidable in a resilient spacer sleeve 308 slidable in a counterbored bushing 310, and a spring 312 biases the diaphragm 300 and the valve closure member toward a normal position closing the exit hole or orifice 282. The exit hole 282 is opened to the extent that the force from the pressure on the lefthand side of the diaphragm member 300 is greater than the spring and the force of the air on the righthand side of the diaphragm member 300. The valve 46 is quickly disassembled merely by taking nuts 313 off the tie rods 284, pulling the housing 270 away from the end wall 242, removing nut 314 from the pull rod 302, and pulling the end wall 272, the diaphragm 288 and the tie rods out of the housing. The reverse procedure is followed to quickly assemble the valve 46.

Figure 8:
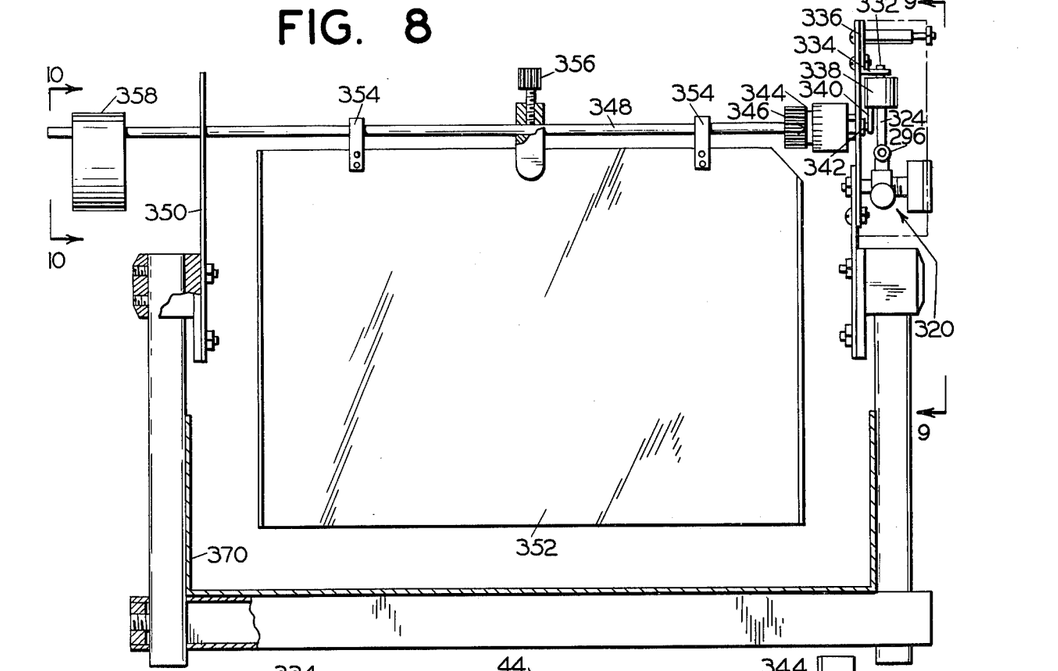
FIG. 8 is an enlarged vertical section taken along line 8—8 of FIG. 1.
Figure 9:
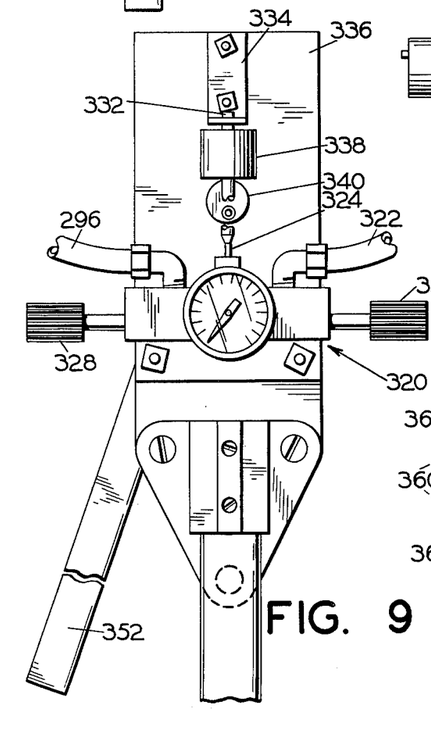
FIG. 9 is an enlarged vertical section taken along line 9—9 of FIG. 8.
Figure 10:
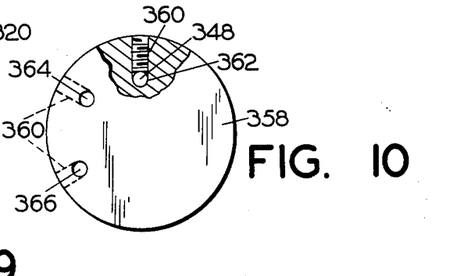
FIG. 10 is an enlarged vertical section taken along line 10—10 of FIG. 8.

Each valve 46 is controlled by air under pressure from the control conduit 296 which is controlled by the senser 44 (FIGS. 1, 8 and 9). The conduit 296 is connected to a known bleeder valve 320 supplied with air under a constant high pressure by a supply conduit 322 and having a needle valve member 324 adjustably controlling the pressure of the air in the control conduit 296. A pressure gauge 326 gives the pressure of the air in the conduit 296, which pressure may be adjusted by adjusting members 328 and 330 manually to calibrate the valve 320. Upper end portion 332 of the member 324 is slidable in a guide bracket 334 fixed to mounting plate 336 and has a weighted follower collar 338 rigidly fixed thereto. The collar rests on an eccentric control cam 340 keyed to a drive shaft 342 (FIG. 8) journaled in the plate 336. An adjustable frictional coupling or overload relief device 344 having an indicator portion 346 couples the shaft 342 to a drive shaft 348 journaled in a mounting plate 350. A sensing vane 352 hung rotatably on the shaft 348 by split clamps 354 is keyed in any desired position of rotation on the shaft 348 by a setscrew 356. An eccentric counterweight 358 (FIGS. 8 and 10) is secured to the shaft 348 in any of three positions by one of setscrews 360. The counterweight 358 has three holes 362, 364 and 366, each positioned a different distance from the center thereof. The shaft may be selectively placed in any of the three holes and keyed to the counterweight to provide the desired counterweighting force.

All the material blown through the opening 36 falls on the vane 352 which normally is biased by the counterweight 358 to an inclined position, and the vane is deflected downwardly against the action of the counterweight to an extent, at any instant, proportionate to the flow of the material thereto. The vane turns the shafts 348 and 344 to turn the cam 340 and the needle valve member 324 is moved accordingly to vary the pressure of the air in the control conduit 296 to adjust the valve 46 to the desired rate of flow of deflecting air. Also, if a predetermined quantity of the material being conveyed piles up on a receiving member 370, the vane 352 is deflected sufficiently to actuate the valve 320 to close the valve 46. The clutch 344 slips to prevent breakage by accidental turning of the vane 352 too far, and the member 324 can move without interference for 360° rotation of the cam 342.

Figure 12:
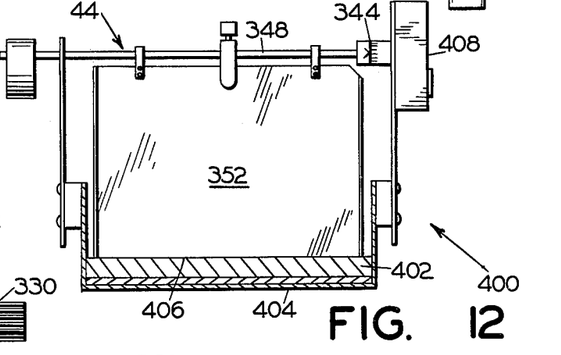
FIG. 12 is a vertical section of a flow controlling device forming an alternate embodiment of the invention.

In a conveying device 400 (FIG. 12) forming an alternate embodiment of the invention, the senser 44 is used to keep uniform the height of material 402 conveyed along a conveyor trough 404 by controlling a supply device (not shown) supplying material to the trough 404. The vane 352 is adjusted to a position in which its lower edge 406 rests on the material. If the material is higher than that desired, it swings the vane upwardly, and the vane turns the shaft 348 and through the coupling 344 actuates an adjusting mechanism 408 to adjust the supply device to reduce the feed to the trough 404. If the material is not high enough, the vane 352 lowers to cause the supply device to increase the feed to the conveyor. Thus, the senser 44 can be used in different applications to control flow.

In a flow controlling system 500 (FIG. 13) forming an alternate embodiment of the invention, air under a substantially constant predetermined pressure is supplied by a supply conduit 502 to a flow control valve 504 having a tapered valve member 506 adjustable relative to an orifice member 508 to control the rate of flow from the valve 504 through a nozzle 510 and a restrictive orifice 512 opening into a cross-sectionally large conduit 514 to effect a reduction in static pressure of the air. The conduit 514 leads to a utilizing system (not shown) requiring air of a constant pressure and having variable volume requirements, which may be, for example, pneumatic deflectors like the deflectors 34. A bleed line 516 connects the interior of the conduit 514 to branch lines 518 and 520 leading to a flow modulating device 522 like the flow modulating device 60 and including a control diaphragm 524 and a power diaphragm 526. The power diaphragm has a rod 528 carrying the valve member 506 and adjusts the valve member 506 relative to the orifice member to control the rate of flow through the valve 504.

Figure 13:
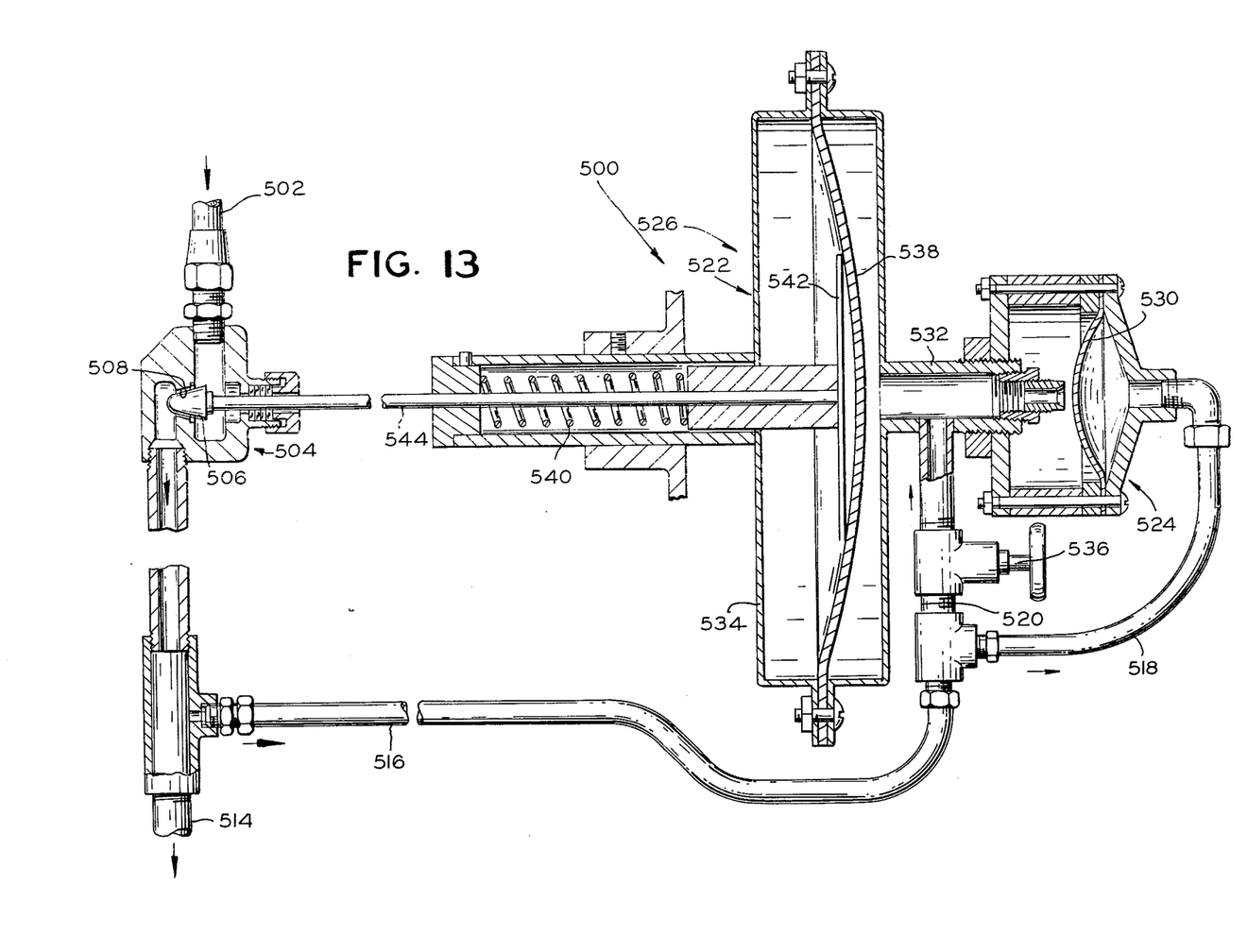
FIG. 13 is a schematic view of a flow controlling system forming an alternate embodiment of the invention.

The flow controlling system 500 supplies air under a constant pressure to the conduit 514 regardless of variations in rate of flow demended by the utilizing system supplied by the conduit 514. If the demand becomes higher, the static pressure of the air in the conduit 514 temporarily decreases. This decreases the static pressure in the bleeder lines 516, 518 and 520 to decrease pressure on the upper side of resilient diaphragm member 520 which moves upwardly away from a bleeder tube 532 to decrease resistance to flow of air through the bleeder tube 532 from a chamber 534 of the power diaphragm 526. The line 520 has an adjustable, flow restricting, pressure reducer 536 therein and supplies air to the chamber under a reduced pressure also. The reduced pressure of the air in the chamber 534 causes a flexible diaphragm 538 to be raised by a spring 540 and a plate 542. The plate 542 is secured to a rod 544 carrying the valve member 506. This raises the valve member 506 to increase the flow through the orifice member 508 and the conduit 514 to raise the static pressure in the conduit, and after a very short hunting period the static pressure in the conduit is restored to the constant predetermined pressure desired for the utilizing system.

When the utilizing system is varied to use a lesser rate of flow of air thereto, the static pressure in the conduit 514 increases. This causes the flow control device 522 to adjust the valve 504 to a more closed condition to supply the air at the rate of consumption and at the constant predetermined pressure in the conduit 514.

In a flow controlling system 600 (FIG. 14) forming an alternate embodiment of the invention a detecting and amplifying unit 601 is responsive to small changes in pressure of air in a large conduit 614 supplied with air through a flow control valve 604 like the valve 504 (FIG. 13) from a supply conduit 602 from a supply of air under a substantially constant predetermined pressure. The conduit 614 leads to a utilizing system (not shown) requiring air of a constant pressure and having variable volume requirements, which may be, for example, pneumatic deflectors like the deflectors 34. A bleed line 616 connects the interior of the conduit 614 to branch lines 618 and 620 leading to a flow modulating device 622.

Figure 14:
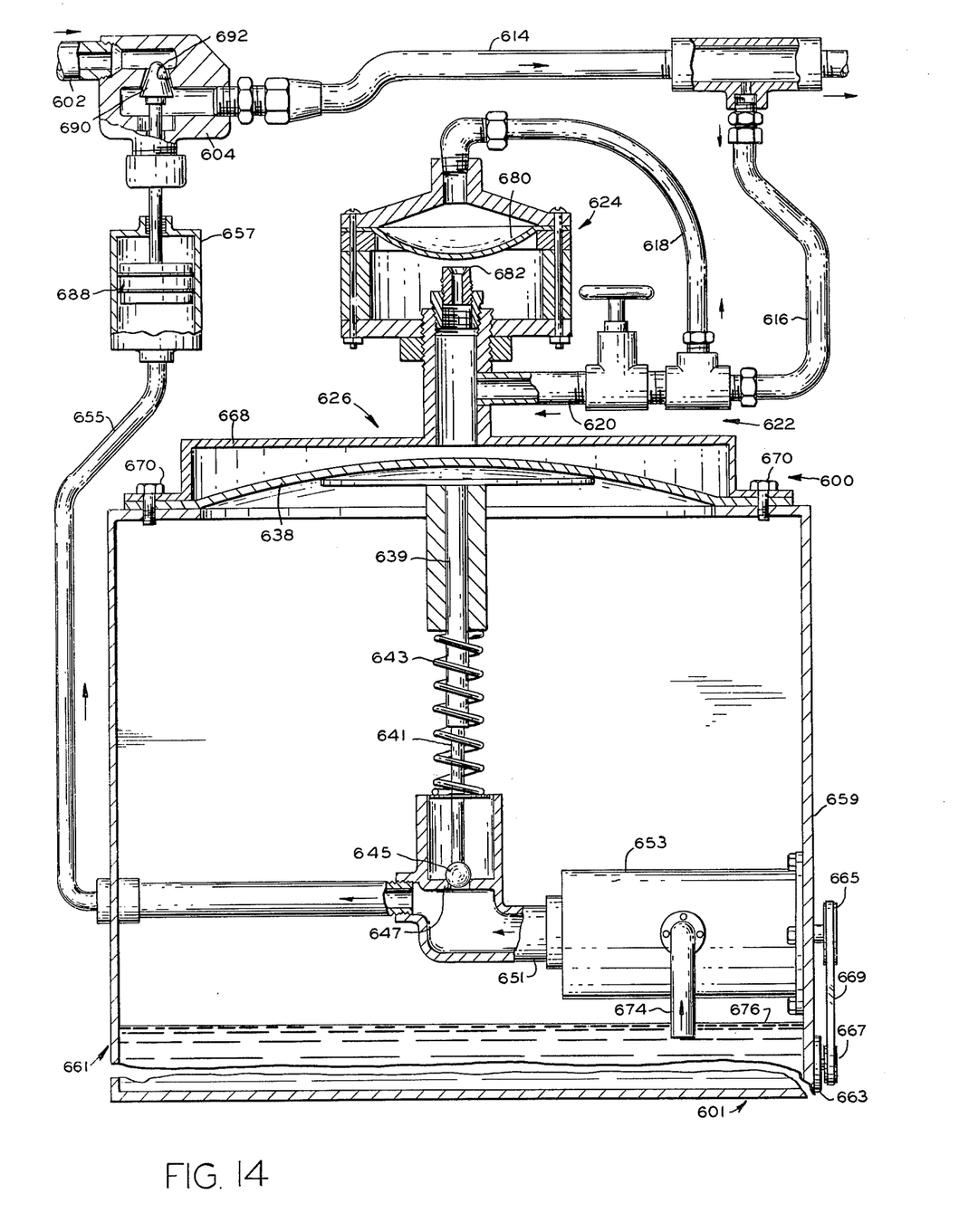
FIG. 14 is a schematic view of a flow controlling system forming an alternate embodiment of the invention.

The flow modulating device 622 includes a control diaphragm 626. The power diaphragm has a flexible diaphragm member 638 carrying a sleeve 639 mounting a rod 641 telescoped therein. A spring 643 urges the rod 641 away from the diaphragm member 638 against a ball 645 to urge the ball toward a position closing a bleeder orifice 647 in a branch 649 of a discharge conduit 651 of a pump 653. The conduit 651 leads to a conduit 655 leading to one end of a single-action cylinder device 657. The pump 653 is mounted on the inner side of a wall 659 of a reservoir 661, and is driven at a constant speed through pulleys 665 and 667 and a belt 669 by an electric motor 663 mounted on the outside of the wall 659.

The power diaphragm 626 includes a flanged upper housing 668 secured by screws 670 to peripheral portion 672 of the top of the reservoir with the diaphragm member 638 clamped therebetween. Preferably vent holes are provided in the upper portion of the reservoir so that the underside of the diaphragm member 638 is subjected to atmospheric pressure. The pump 633 has an inlet 674 depending into a pool 676 of oil or other hydraulic liquid.

If the static pressure of the gas in the conduit 614 becomes greater than desired, a flexible diaphragm member 680 is pressed closer to a bleed orifice 682 to increase pressure in the housing 668. This forces the power diaphragm member 638 downwardly to press ball 645 downwardly to increase the pressure of the liquid in the line 655 to move piston 688 and valve member 690 upwardly to reduce the flow of the gas through orifice 692 of the valve 604. This reduces the pressure in the conduit 614 to that desired. Thus, a slight change in pressure in the conduit is corrected. Conversely, if the pressure in the conduit 614 should drop, the power diaphragm 626 permits the ball 645 to raise to bleed off more hydraulic liquid and reduce the pressure of the liquid in the cylinder 657 to open the valve 604 further to raise the pressure of the gas in the conduit 614 back to the desired pressure.

Figure 15:
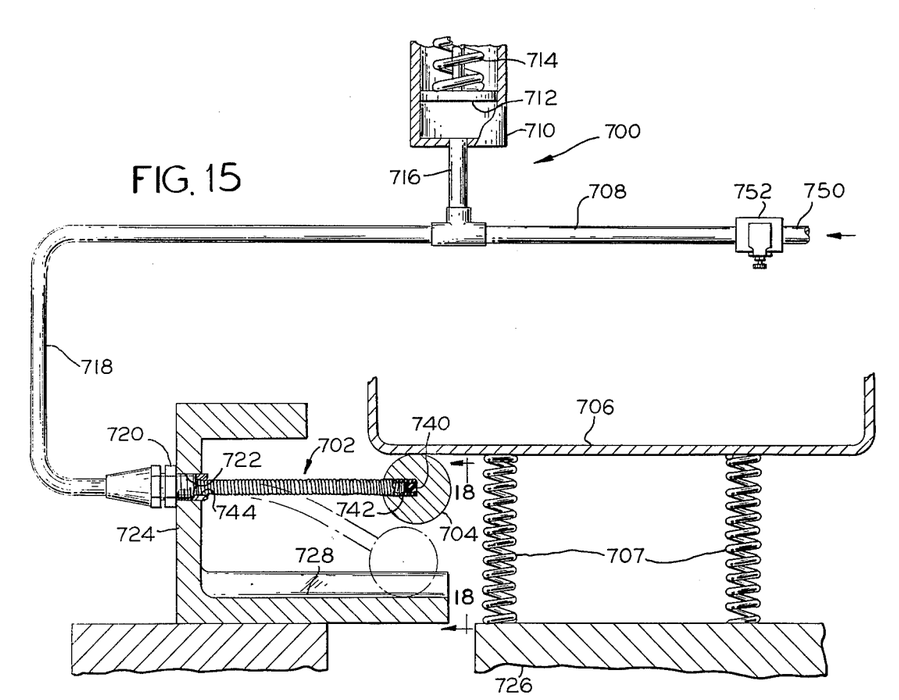
FIG. 15 is a fragmentary, partially sectional view of a flow controlling system forming an alternate embodiment of the invention.
Figures 16, 17, 18:
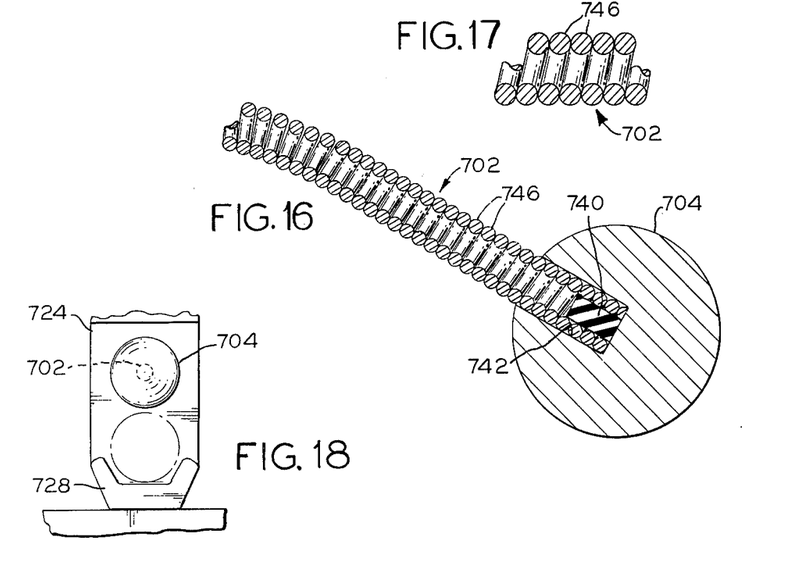
FIG. 16 is an enlarged, fragmentary, vertical sectional view of a senser of the system of FIG. 15 in one position.
FIG. 17 is an enlarged, fragmentary, vertical sectional view of the senser of FIG. 16 in another position.
FIG. 18 is a vertical sectional view taken along line 18—18 of FIG. 15.

EMBODIMENT OF FIGS. 15 TO 17

A flow controlling system 700 forming an alternate embodiment of the invention includes an elongate closewound spiral spring 702 preferably of stainless steel carrying at its free end a knob 704 fitting over the end portion and cemented thereto. The knob is positioned under and in engagement with a scale member 706 supported by compression springs 707. The spiral spring 702 is deflected in accordance with the weight of material on the scale member 706, and bleeds air from a line 708 to a control cylinder 710 to control the pressure of the air supplied to the cylinder in accordance with the weight of material on the scale member. As the weight of material on the scale member approaches a predetermined magnitude desired to be obtained, the spring 702 is deflected more and more to permit a greater escape of air, and a piston 712 is lowered by a spring 714 and reduces more and more the flow of material to the scale member. Thus, the spring 702 serves as a position responsive senser and as a position responsive bleeder.

The line 708 has a branch 716 leading to one end of the cylinder 710 and a branch 718 connected to a tubular fitting 720 screwed into a tapped bore 722 in a bracket 724 mounting the fitting 720 in a fixed position relative to a support 726 supporting the springs 707. The bracket has a U-shaped guide portion 728 loosely confining the knob to a vertical path and limiting extreme downward movement of the knob beyond a fully open position of the spring 702.

A rubber plug 740 (FIG. 15) is secured by cement in the free end portion of the spring 702 and seals off the end of the spring 702. The plug and the free end portion of the spring fit closely in a socket 742 in the knob 704, which is cemented to the end portion of the spring 702. The other end portion of the spring 702 fits tightly and in sealing engagement with the side walls of a bore 744 in the fitting 720. The spring 702 is overwound so that its turns 746 normally spring tightly together in substantial sealing relationship as illustrated in FIG. 27 with full pressure in the line 708 and even with the weight of the knob 704 tending to deflect the spring. However, when the scale member 706 engages the knob and exerts a slight force thereon, the spring 702 is bowed downwardly as illustrated in FIG. 16 to open the portions of the turns at the upper side of the spring. Air under a constant pressure is supplied to the line 708 by a supply line 750 and an adjustable reducing valve 752.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a valve device,
 a cylindrical housing having an inlet at one side thereof and having an outlet end and a second end,
 a partition disc fitting in the housing and positioned between the outlet end and the inlet end and having an orifice therethrough,
 a diaphragm including a housing member positioned in the portion of the housing adjacent the second end thereof,
 an outlet disc adapted to bear against the outlet end of the housing,
 a third disc adapted to bear against the second end of the housing,
 connector means connecting the housing member to the third disc,
 tie rod means connecting the housing member to the outlet disc to press the outlet disc against the outlet end of the housing,
 a valve closure member adapted to close the orifice,
 and a valve rod member mounting the closure member and carried by and operable by the diaphragm.
2. The valve device of claim 1 wherein the tie rod means includes releasable fasteners positioned at the outside face of the outlet disc.
3. The valve device of claim 1 wherein the third disc has a tapped central opening and the housing member has a nipple portion threaded into the tapped central opening to mount the diaphragm.
4. The valve device of claim 1 wherein the diaphragm includes a diaphragm member connected to the valve rod member,
 fluid pressure means for supplying fluid under pressure to the side of the diaphragm member adjacent the second end of the housing for pressing the diaphragm member and the valve rod member toward the outlet,
 the valve closure member being mounted on the valve rod member on the side of the partition disc adjacent the outlet end of the housing,
 and resilient means normally urging the valve rod member and the valve closure member away from the outlet end of the housing toward an orifice closing position so that, if the pressure of the fluid supplied by the fluid pressure means drops to atmospheric pressure, the orifice is closed by the valve closure member.

* * * * *